(12) United States Patent
Wuerthele et al.

(10) Patent No.: US 8,752,986 B2
(45) Date of Patent: Jun. 17, 2014

(54) VEHICLE LAMP ASSEMBLY HAVING UNIFORM LIT APPEARANCE

(75) Inventors: Stuart Roger Wuerthele, Saline, MI (US); Jeremy Sasena, Canton, MI (US); Michael Douglas Van Hoef, Bloomfield Hills, MI (US)

(73) Assignees: Toyota Motor Engineering & Manufacturing North America, Inc., Erlanger, KY (US); North American Lighting, Inc., Paris, IL (US)

( * ) Notice: Subject to any disclaimer, the term of this patent is extended or adjusted under 35 U.S.C. 154(b) by 273 days.

(21) Appl. No.: 13/401,102

(22) Filed: Feb. 21, 2012

(65) Prior Publication Data

US 2013/0215633 A1   Aug. 22, 2013

(51) Int. Cl.
*F21V 7/04*    (2006.01)
*F21V 7/00*    (2006.01)

(52) U.S. Cl.
USPC ............................ 362/347; 362/511; 362/516

(58) Field of Classification Search
CPC ... F21S 48/00; F21S 48/1159; F21S 48/1241; F21V 7/00; F21V 7/04; F21V 13/04; B60Q 1/0047
USPC .................................. 362/509–522, 326–350
See application file for complete search history.

(56) References Cited

U.S. PATENT DOCUMENTS

| | | | |
|---|---|---|---|
| 6,846,100 B2 * | 1/2005 | Imazeki et al. | 362/517 |
| 7,097,336 B2 | 8/2006 | Lin | |
| 2010/0157619 A1 | 6/2010 | Chinniah et al. | |
| 2010/0202153 A1 | 8/2010 | Schwab | |
| 2011/0019431 A1 | 1/2011 | Wegner et al. | |
| 2012/0051077 A1 * | 3/2012 | Arai | 362/516 |
| 2012/0069592 A1 * | 3/2012 | Natsume et al. | 362/511 |

* cited by examiner

*Primary Examiner* — Karabi Guharay
*Assistant Examiner* — Nathaniel Lee
(74) *Attorney, Agent, or Firm* — Gifford, Krass, Sprinkle, Anderson & Citkowski, P.C.

(57) ABSTRACT

A vehicle lamp assembly includes a lamp housing, a primary lamp unit, and an auxiliary lamp unit. The primary lamp unit and the auxiliary lamp unit are provided within the lamp housing. The auxiliary lamp unit includes a first lighting device, a second lighting device and a supplemental lighting device. The first lighting device is configured to illuminate a portion of the lamp housing in a first direction and the second lighting device is configured to illuminate a portion of the lamp housing in a second direction. The supplemental lighting device is positioned in the lamp housing at an intersection of the first and second directions to provide a uniform lit appearance at a transition of the first lighting device and the second lighting device.

18 Claims, 7 Drawing Sheets

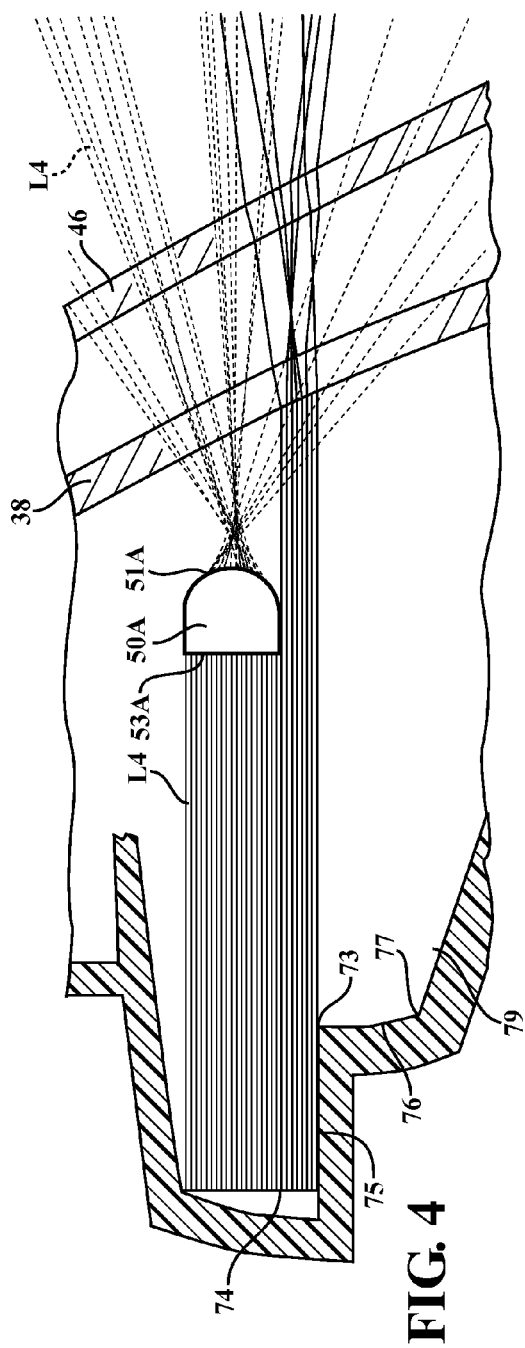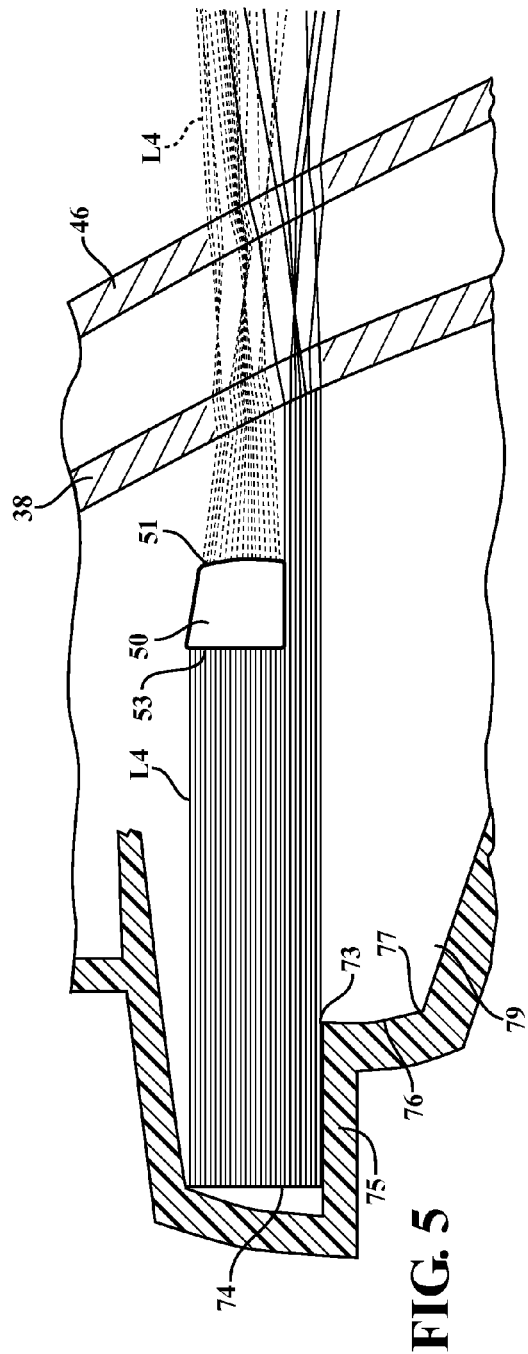

VEHICLE LAMP ASSEMBLY HAVING UNIFORM LIT APPEARANCE

FIELD OF THE INVENTION

The present invention relates generally to a lamp assembly for use in automotive vehicles. More particularly, to a vehicle lamp assembly having a first lighting device, second lighting device, and a supplemental lighting device that provides a uniform lit appearance at a transition between the first lighting device and the second lighting device.

BACKGROUND OF THE INVENTION

Modern automotive vehicles typically include lamp assemblies used for various functions of illuminating the exterior of a vehicle. The lamp assemblies typically include a primary nighttime running lamp, as well as auxiliary lamps that function as parking lamps, daylight running lamps, reverse indicators, brake lamps, turn signals, and various other signaling devices. Although previous lamp assemblies typically use traditional filament type light bulbs, there is a current trend of replacing the bulb type light sources with light emitting diodes (LEDs).

To preserve the limited packaging space of the lamp assemblies, the auxiliary light units, such as daytime running lamps, are often provided along an edge of the lamp's housings. In order to increase the aesthetic appearance of the daytime running lamps, the auxiliary lamp unit can combine two separate light sources to provide a daytime running lamp having a nonlinear overall appearance. However, utilizing two light sources results in a discontinued appearance at the intersection point between the two light sources. As such, the aesthetic appearance of the auxiliary light function is diminished due to the nonuniform appearance of the auxiliary lamp.

Thus, there exists a need for an auxiliary lamp unit that combines two light sources and which has a uniform lit appearance across the transition from one light source to the other.

SUMMARY OF THE INVENTION

The present invention provides a vehicle lamp assembly having an auxiliary lamp unit which overcomes the above-mentioned disadvantages of the previously known lamp assemblies by providing a uniform lit appearance at a transition between a first lighting device and a second lighting device.

In brief, the vehicle lamp assembly includes a lamp housing, a primary lamp unit, and an auxiliary lamp unit. The primary lamp unit and the auxiliary lamp unit are provided within the lamp housing. The auxiliary lamp unit includes a first lighting device, a second lighting device and a supplemental lighting device. The first lighting device is configured to illuminate a portion of the lamp housing in a first direction and the second lighting device is configured to illuminate a portion of the lamp housing in a second direction. The supplemental lighting device is positioned in the lamp housing at an intersection of the first and second directions to provide a uniform lit appearance at a transition of the first lighting device and the second lighting device.

The first lighting device includes an elongated light pipe and a first light source. The elongated light pipe has a proximate end, a distal end, a front face and an opposing rear face. The front face and the rear face extend between the proximate end and distal end. The proximate end of the light pipe is coupled to the first light source to transmit and diffuse light across the elongated light pipe in the first direction. The light pipe also includes a curved portion adjacent the proximate end. The supplemental lighting device is positioned behind the curved portion of the light pipe.

The supplemental lighting device includes a supplemental light source and a supplemental reflector. The supplemental light source is positioned behind the first light source and the supplemental reflector is positioned behind the curved portion of the light pipe. A portion of the light emitted by the supplemental light source is directed by the supplemental reflector to enter the rear face of the curved portion of the light pipe and exit the front face of the curved portion of the light pipe to maintain the intensity of illumination throughout the curved portion of the light pipe to provide a uniform illuminated appearance at the transition of the first light device and the second light device. The remainder of the light emitted by the supplemental light source is directed by the supplemental reflector to replicate the appearance of the second lighting device.

BRIEF DESCRIPTION OF THE DRAWINGS

A better understanding of the present invention will be had upon reference to the following detailed description when read in conjunction with the accompanying drawings, wherein like reference characters refer to the like parts throughout the several views and in which:

FIG. 4 is a side cross-sectional view of an alternative light pipe taken through the supplemental reflector;

FIG. 5 is a side cross-sectional view of the light pipe taken through the supplemental reflector;

DETAILED DESCRIPTION OF THE INVENTION

The present invention has utility as a vehicle lamp assembly that provides a uniform lit appearance at a transition between a first lighting device and a second lighting device which overcomes the above-mentioned disadvantages. A supplemental lighting device positioned at an intersection of the first lighting device and the second lighting device increases the intensity of illumination at the transition area and effectively blends the illumination of the first lighting device and the second lighting device to provide a uniform lit appearance of the auxiliary lamp unit. Further, an inner lens is positioned between the lamp housing and an outer lens to cover the auxiliary section of the lamp housing that receives the auxiliary lamp unit.

Figure 1:
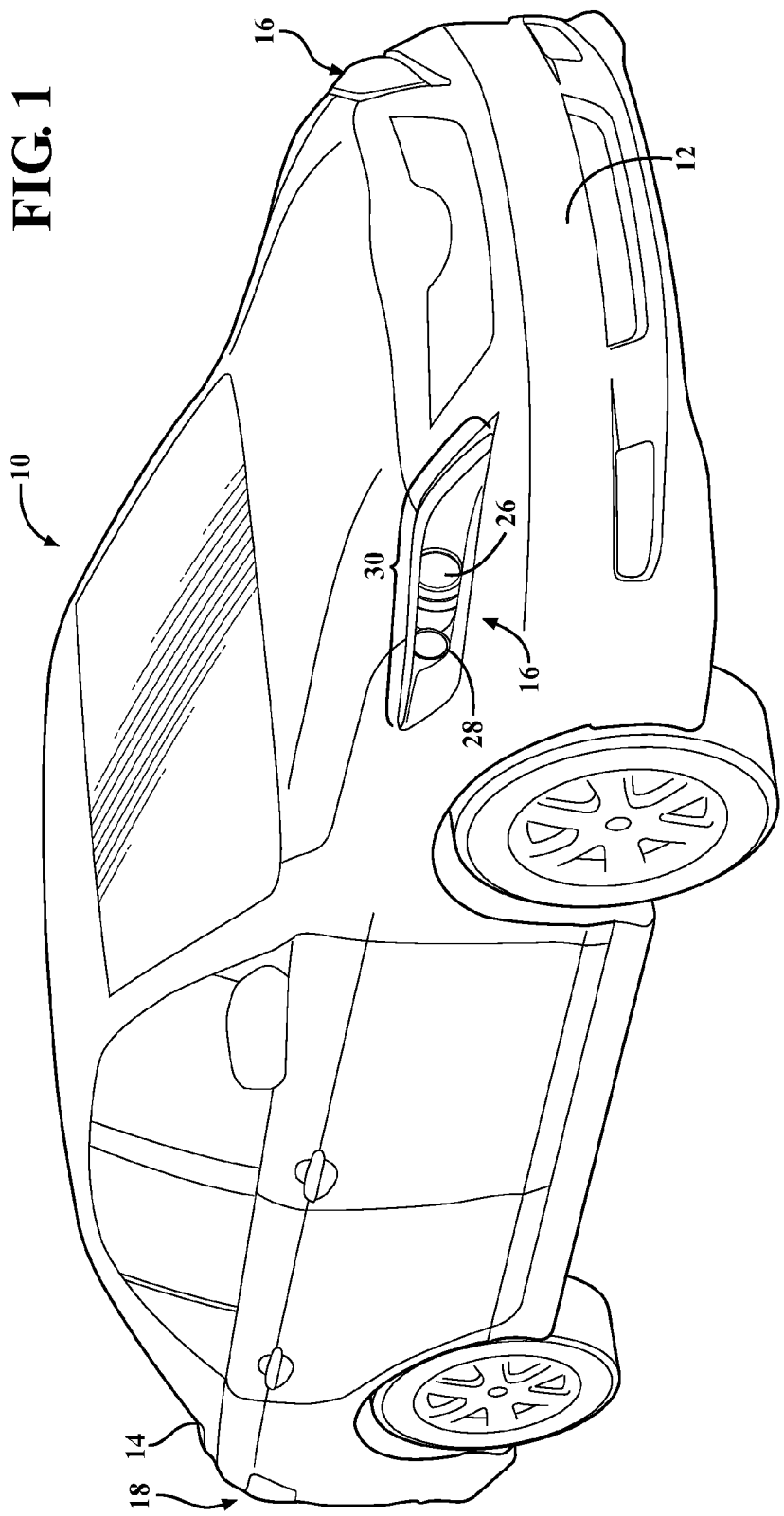
FIG. 1 is a perspective view of an automotive vehicle having the inventive vehicle lamp assembly.

With reference to FIG. 1, an automotive vehicle, having the inventive lamp assembly, is generally indicated at 10. The automotive vehicle 10 includes a front end 12 and an opposite rear end 14 positioned at opposing longitudinal ends in the vehicle length direction. Positioned at either side of the front end 12, in the vehicle width direction, is a vehicle lamp assembly 16. The lamp assemblies 16 positioned on either side of the front end 12 of the automotive vehicle 10 are mirror images and, in an effort to consolidate duplicate description, only one lamp assembly 16 will be described. It is also appreciated that the rear end 14 of the automotive vehicle 10 includes rear lamp assemblies 18 positioned at either side in the vehicle width direction. Although only one rear lamp assembly 18 is visible in FIG. 1, a mirror image counterpart is present on the opposite side in the vehicle width direction of the rear end 14.

The lamp assembly 16 includes a primary lamp unit 26, a secondary lamp unit 28, and an auxiliary lamp unit 30. The primary lamp unit 26 is optionally the forward illuminating headlamp of the vehicle lamp assembly 16 and provides the primary illumination source for nighttime driving. In the alternative, the primary lamp unit 26 is optionally the primary brake light of the rear lamp assembly 18. The secondary lamp unit 28 acts as an ancillary lamp unit to the primary lamp unit 26, optionally functioning as a high beam ancillary light to the primary lamp unit 26 or a turn signaling lamp. The auxiliary lamp unit 30 functions as a daytime running, parking lamp, or other auxiliary lighting functions, in order to increase the visibility of the vehicle during daylight and nighttime parking conditions, respectively. It is appreciated, of course, that the auxiliary lamp unit 30 is not limited to those functions and can be used in various other lamp functions without deviation from the scope of the invention.

In order to provide high functionality the auxiliary lamp unit 30 includes two light sources, as will be described in greater detail below. However, to provide an aesthetically pleasing appearance the auxiliary lamp unit 30 is required to have a uniform appearance across the entire auxiliary lamp unit 30. In the illustrated embodiment, the auxiliary lamp unit 30 is required to have a uniform appearance extending across the upper edge and inner edge of the lamp assembly 16 such that it appears that the entire auxiliary lamp unit 30 is illuminated by a single light source.

Figure 2:
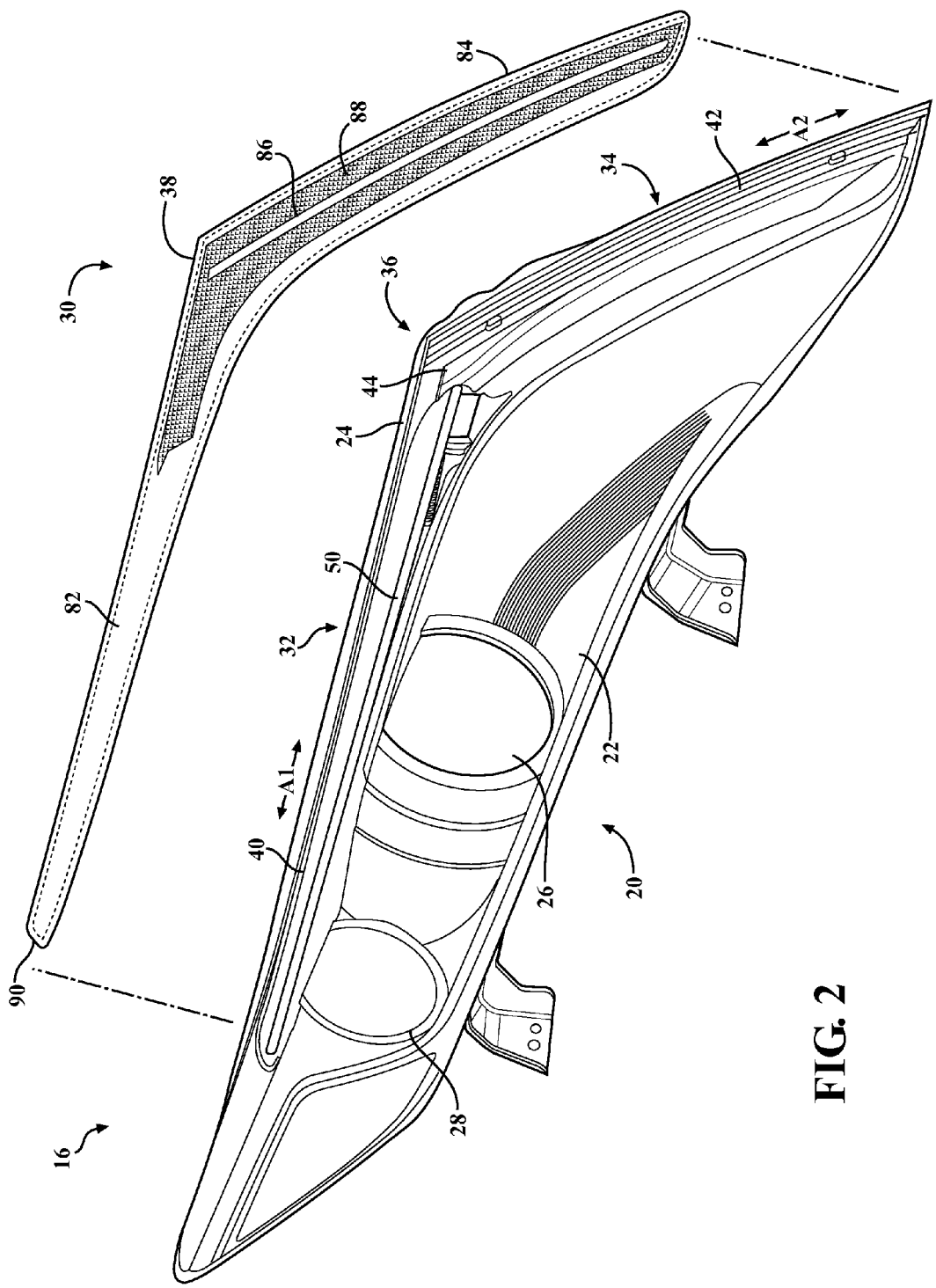
FIG. 2 is a front view of the vehicle lamp assembly including the inner lens.

With reference to FIG. 2, the vehicle lamp assembly 16 is illustrated as a front headlamp assembly. It is appreciated, of course, that the inventive aspects of the present invention are optionally incorporated into various other lamp assemblies illustratively including the rear lamp assemblies 18 without deviating from the spirit and scope of the present invention.

The vehicle lamp assembly 16 includes a lamp housing 20 having a primary section 22 and an auxiliary section 24. The primary lamp unit 26 and the secondary lamp unit 28 are provided within the primary section 22 of the lamp housing 20. The auxiliary lamp unit 30 is provided in the auxiliary section 24 of the lamp housing 20.

The auxiliary lamp unit 30 includes a first lighting device 32, a second lighting device 34, a supplemental lighting device 36, and an inner auxiliary lens cover 38. The inner auxiliary lens cover 38 is formed of a transparent or translucent material and has a shape corresponding to the shape of the auxiliary section 24 and attaches to and covers the auxiliary section 24. As described in greater detail below, the inner auxiliary lens cover 38 includes an inner surface having various optical features in order to optimize the light emitted by the auxiliary lamp unit 30 without degrading the overall aesthetic appearance of the vehicle lamp assembly 16.

The first lighting device 32 is configured to illuminate a portion of the lamp housing 20, specifically a first leg 40 of the auxiliary section 24, along a first direction depicted by arrow A1. The second lighting device 34 is similarly configured to illuminate a second leg 42 of the auxiliary section 24, along a second direction depicted by arrow A2 in FIG. 2. The auxiliary section 24 is positioned at a corner portion of the lamp housing 20 with the first leg 40 and the second leg 42 defining a generally L shape. The first leg 40 intersects the second leg 42 at a transition area 44. In the illustrated embodiment the intersection of the first leg 40 and the second leg 42 provides a generally obtuse angle. However, the auxiliary lamp section 24, the inner auxiliary lens cover 38, and the auxiliary lamp unit 30 are not limited to such a configuration.

Figure 3:
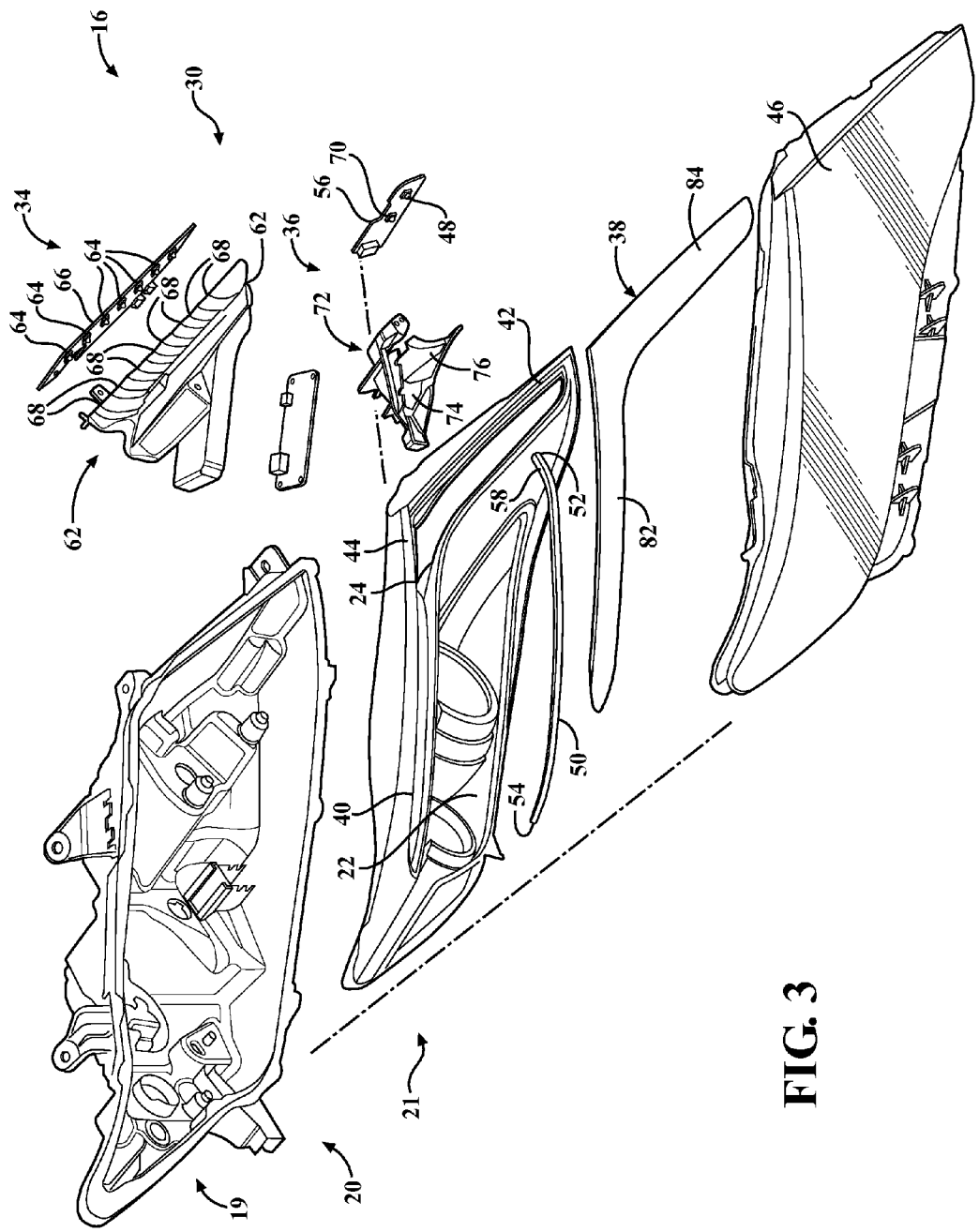
FIG. 3 is an exploded view of the vehicle lamp assembly.

As seen in FIG. 3, the lamp housing 20 includes a rear section 19 and a front section 21. The rear section 19 includes a plurality of attachments at which the lamp assembly 16 is operable to be mounted to the vehicle 10. An outer lens cover 46 is provided to cover a portion of the lamp housing 20 including both the primary section 22 and the auxiliary section 24. The outer lens cover 46 acts as a protective cover, and is formed of a transparent or translucent material which is mounted to the lamp housing 20 in order to protect the primary lamp unit 26 and the auxiliary lamp unit 30 from the elements. The outer lens cover 46 is positioned on the lamp housing 20, specifically the front section 21, such that the inner auxiliary lens cover 38 is positioned between the lamp housing 20, i.e. the auxiliary section 24, and the outer lens cover 46.

The first lighting device 32 includes a first light source 48 and an elongated light pipe 50 dimensioned to extend along the first leg 40 of the auxiliary section 24 in the direction of arrow A1. The elongated light pipe 50 is formed from a material that can transmit light and diffuse light in preselected amounts across the length of the light pipe 50. The light pipe 50 includes a light pipe body having a proximate end 52 and an opposite distal end 54.

Figure 6:
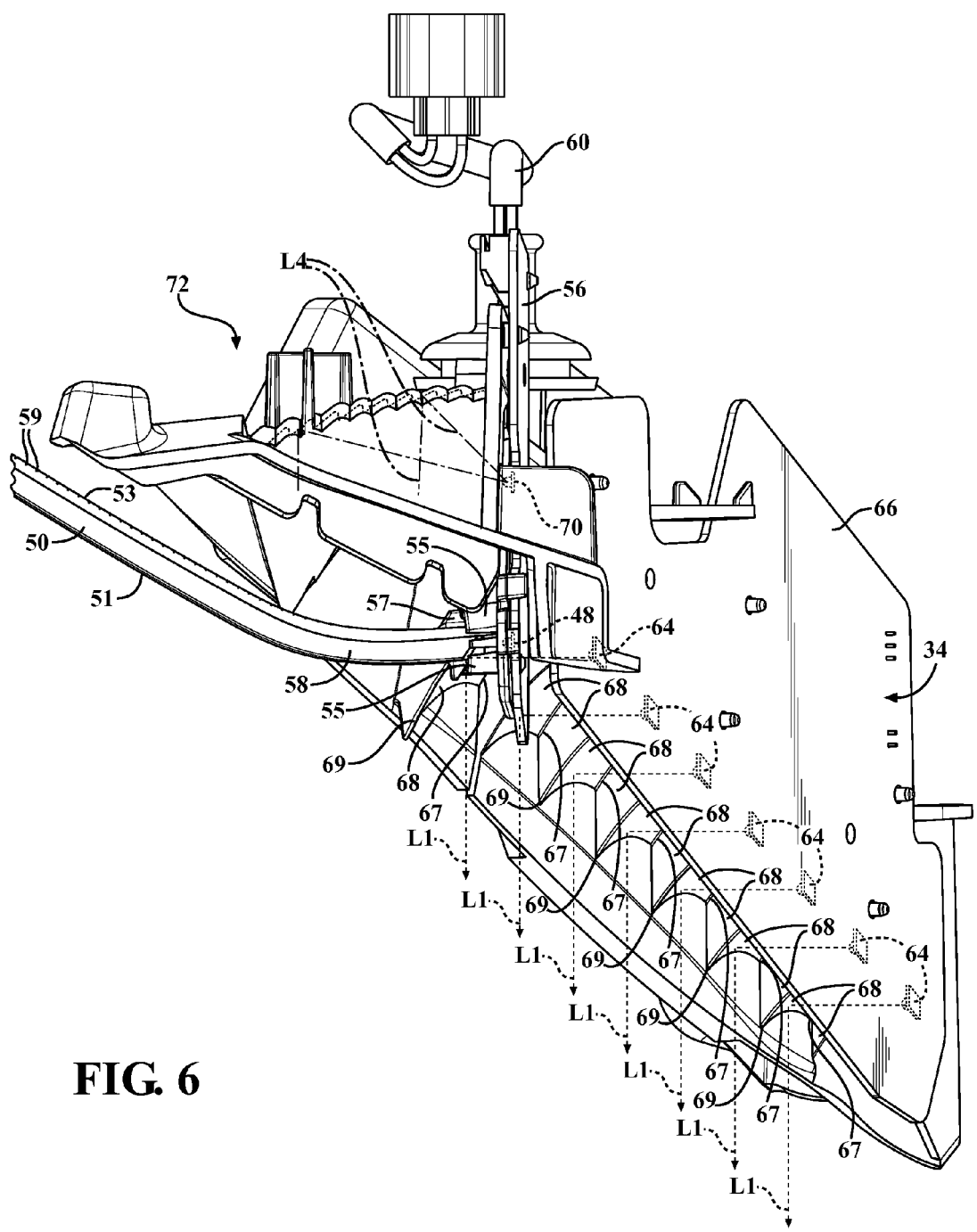
FIG. 6 is a top view of the first light device, second light device, and the supplemental lighting device.

The first light source 48 is optionally a light emitting diode (LED) that is provided on a circuit board 56. The circuit board 56 and the first light source 48 are positioned at the intersection of the first leg 40 and the second leg 42 of the auxiliary section 24 at the transition area 44. As best seen in FIG. 6, a wiring harness 60 is used to connect the circuit board 56 to the vehicle power system to supply the circuit board 56 with electricity in order to power the first light source 48. Further, a coupler 55 accurately positions the proximate end 52 of the light pipe 50 in front of the first light source 48 such that light emitted from the first light source 48 is transmitted and diffused through the light pipe 50.

The second lighting device 34 includes a second reflector 62 and a plurality of second light sources 64. In the illustrated embodiment the second light sources 64 are linearly oriented LEDs positioned on a circuit board 66; however, the second lighting source 34 is not limited to LEDs. A circuit board 66, similar to circuit board 56, is connected to the vehicle power system through the wiring harness 60 or a separate wiring harness (not shown).

Figure 8:
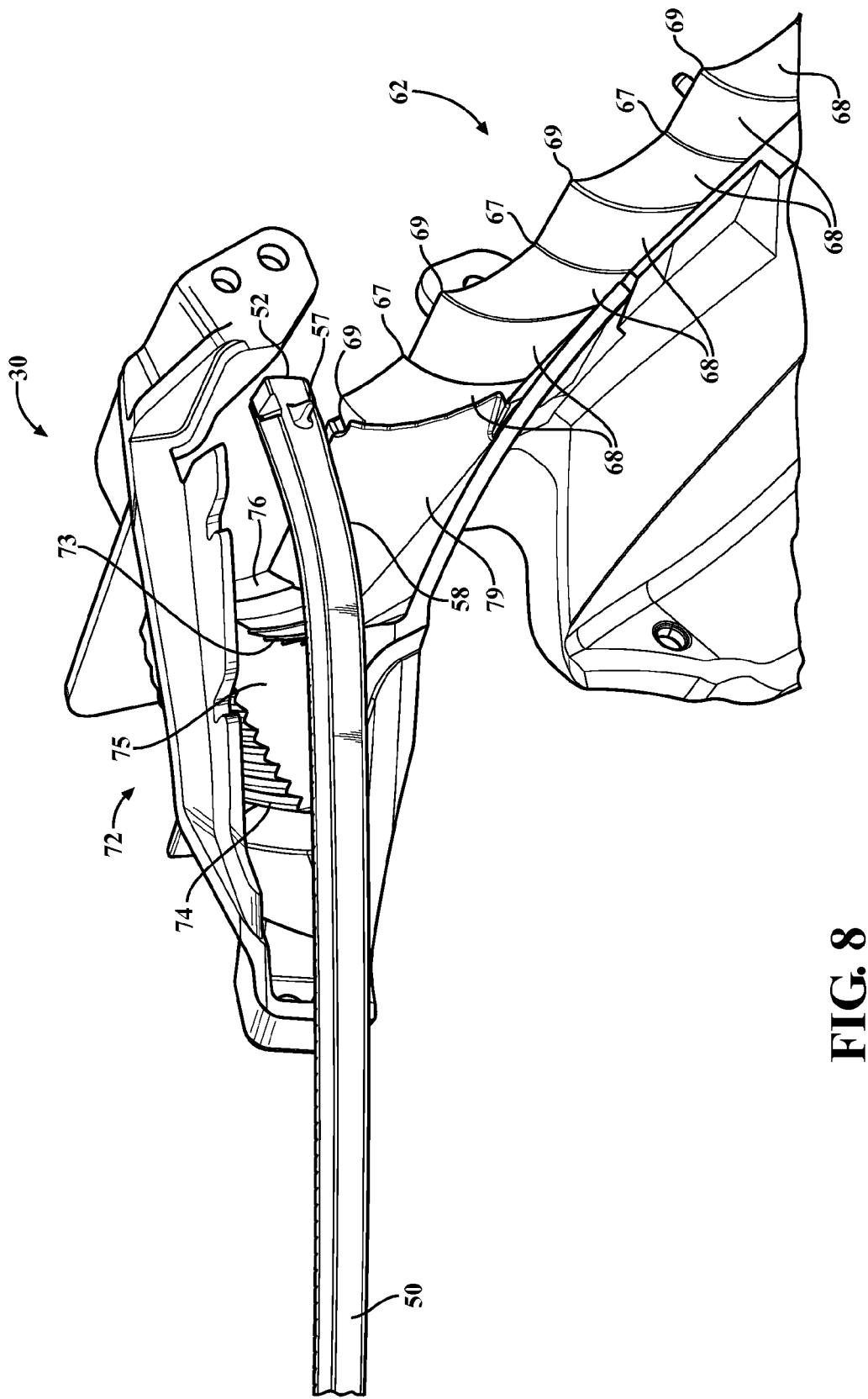
FIG. 8 is a perspective view of the light pipe, the supplemental reflector and the second reflector.

As seen in FIGS. 6 and 8, the second reflector 62 is an elongated reflector having a plurality of shaped portions 68 corresponding to each of the plurality of light sources 64. The shaped portions 68 provide a curved parabolic reflecting area for each of the plurality of light sources 64. Each of the shaped portions 68 includes a bottom portion 67 at one end and an apex 69 at an opposite end. The apex 69 defines the elongated second reflector 62 into the shaped portions 68 that correspond to each of the plurality of second light sources 64.

The shaped portions 68 reflect light L1 emitted by the second light sources 64 in order to illuminate the second leg 42 of the auxiliary section 24 of the lamp housing 20. As the second light source includes a plurality of light sources 64 each having a corresponding shaped portion 68 of the second reflector 62, the second lighting device 34 provides a high intensity illumination in the second direction along arrow A2. Accordingly, the second leg 42 of the auxiliary section 24 is provided with a high brightness level.

As the first lighting device 32 only includes a single LED as the first light source 48, the illumination level of the first leg 40 of the auxiliary section 24 along arrow A1 of the lamp housing 20 is less than the illumination level of the second leg 42 of the auxiliary section 24 along arrow A2 provided by the second lighting device 34. As such, the transition area 44 between the first leg 40 and the second leg 42 of the auxiliary section includes an inconsistent lit appearance. Further, with reference to FIGS. 6 and 7, the light pipe 50 of the first lighting device 32 includes a curved portion 58 that is adjacent the proximate end 52. The curved portion 58 is provided at an angle from the remainder of the light pipe 50 to connect the end to the circuit board 56. Specifically, a portion of the front section 21 of the lamp housing 20 is positioned between the first light source 48 and the inner auxiliary lens cover 38.

Figure 7:
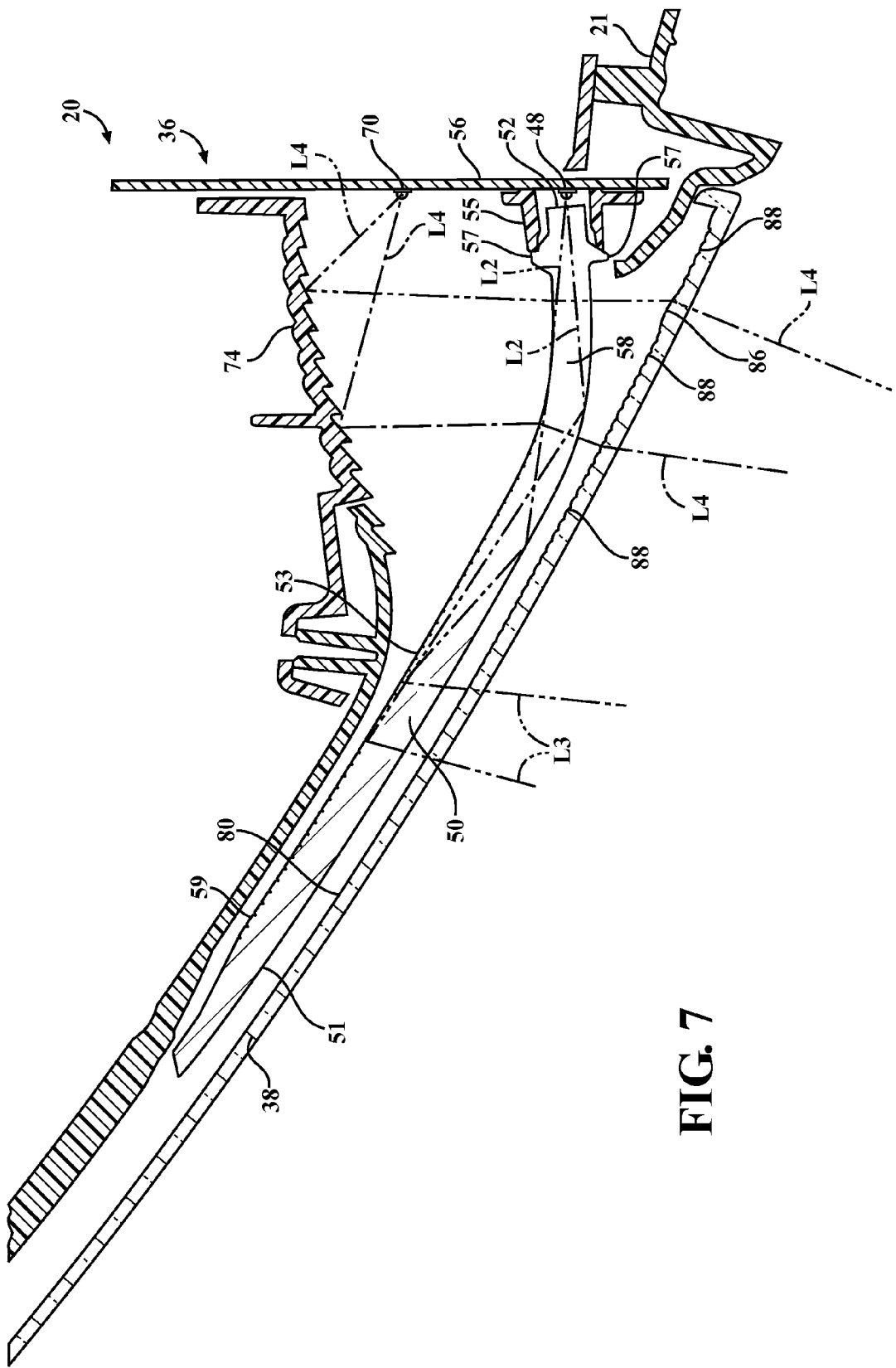
FIG. 7 is a top cross-sectional view of the first lighting device and the supplemental lighting device.

A pair of tabs 57 extending from the light pipe 50 engages with the coupler 55 to position the proximate end 52 of the light pipe 50 to face the first light source 48. As best seen in FIG. 7, the light L2 that is emitted from the first light source 48 enters the proximate end 52 and is transmitted and diffused across the length of the light pipe 50. Specifically, the remainder of the light pipe 50 other than a portion of the curved portion 58 adjacent the pair of tabs 57 is provided with teeth 59 formed in the rear face 53 of the light pipe 50. The teeth 59 are provided uniformly across the length of the light pipe 50, excluding the portion of the curved portion 58 adjacent the pair of tabs 57, and progressively increase in depth towards the distal end 54. As the light L2 is transmitted across the light pipe 50, the light reflects on the teeth 59 and light L3 is diffused from the light pipe 50.

Due to the shape of the curved portion 58, the amount of light L1 emitted from the first light source 48 that is diffused across the curved portion is diminished. As such, the auxiliary lamp unit 30 is provided with an inconsistent lit appearance due to the higher level of intensity of the second lighting device 34 than the reduced amount of diffused light L2 from the curved portion 58. As the curved portion 58 is provided at the transition area 44 of the first leg 40 and the second leg 42 the illumination level of the transition area 44 is less than the second lighting device 34 and the remaining portion of the light pipe 50, excluding the curved portion 58.

In order to provide a uniform lit appearance at the transition area 44 so as to blend the light illuminated from the first lighting device 32 and the second lighting device 34, a supplemental lighting device 36 is provided at the intersection of the first leg 40 and the second leg 42 which encompasses the transition area 44. The supplemental lighting device 36 is positioned behind the first lighting device 32 at the intersection of the first lighting device 32 and the second lighting device 34. The supplemental lighting device 36 includes a supplemental light source 70 and a supplemental reflector 72.

The supplemental light source 70 is an LED positioned behind the first light source 48 on the circuit board 56. As best seen in FIG. 8, the supplemental reflector 72 includes an upper tier 74 and a lower tier 76. The upper tier 74 is positioned behind the curved portion 58 of the light pipe 50 and is provided to reflect light L4 emitted by the supplemental light source 70 to enter the rear face 53 of the curved portion 58 and exit the front face 51 of the curved portion 58 of the light pipe 50. The supplemental lighting device 36 is provided to increase the illumination of the curved portion 58 of the light pipe 50 so as to provide a uniform lit appearance at a transition of the first lighting device 32 and the second lighting device 34. Specifically, the light L4 emitted by the supplemental light source 70 is reflected from the upper tier 74 of the supplemental reflector 72, and the light L4 passes through the curved portion 58 of the light pipe 50 thereby increasing the level of illumination of the curved portion 58 of the light pipe 50.

The upper tier 74 of the supplemental reflector 72 is provided with a stepped parabolic shape. The stepped parabolic shape is provided by interconnecting a plurality of progressively increasing parabolas halves into a single reflective surface. The stepped parabolic shape of the upper tier 74 of the supplemental reflector 72 allows light L4 emitted from the supplemental light source 70 to be reflected across the length of the curved portion 58 of the light pipe 50. Specifically, the light L4 will reflect on the various parabolic shapes of the upper tier 74 of the supplemental reflector 72 and be reflected to pass through the curved portion 58 at predetermined distances from the proximate end 52. The stepped parabolic shape distributes the light L4 evenly so as to provide a uniform lit appearance between the curved portion 58 and the remainder of the light pipe 50 in which a higher level of light L2 emitted from the first light source 48 is diffused as light L3. The uniform illumination of the curved portion 58 with the remainder of the light pipe 50 provides a uniform lit appearance of the first lighting device 32 and increases the uniform lit appearance between the first lighting device 32 and the second lighting device 34 across the transition area 44.

In addition, a portion of the light L4 emitted from the supplemental light source 70 is reflected off the supplemental reflector 72 and extends above and below the light pipe 50, as best seen in FIGS. 4 and 5, and extends through the inner auxiliary lens cover 38 and the outer lens cover 46 so as to increase the level of illumination of the transition area 44, thereby providing the auxiliary lamp unit 30 with a uniform lit appearance.

The lower tier 76 of the supplemental reflector 72 is positioned between the upper tier 74 and the second reflector 62. The lower tier 76 extends between the light pipe 50 and the second reflector 62 so as to reflect light L4 emitted by the supplemental light source 70. Specifically, a top edge 73 of the reflective surface of the lower tier 76 connects to the planar section 75, and a bottom edge 77 of the lower tier 76 connects to a generally planar portion 79 that connects to the upper most apex 69 of the second reflector 60. The lower tier 76 of the supplemental reflector reflects light to provide a smooth transition between the second lighting device 34 and the first lighting device 32 at the transition area 44 in order to provide the auxiliary section 24 with a uniform lit appearance. The lower tier 76 includes a stepped parabolic shape similar to the shape of the upper tier 74. The reflective surface of the lower tier 76 is spaced apart from the reflective surface of the upper tier 74 by a generally planar section 75. As best seen in FIG. 8, the planar section 75 is generally normal to the reflective surfaces of the upper tier 74 and the lower tier 76.

FIGS. 4 and 5 illustrate the cross sectional shape of the light pipe 50 taken through a portion of the curved portion 58. The light pipe 50 is optimized in order to provide a concentrated distribution of light across the first leg 40. With reference to FIG. 4, a light pipe 50A having a generally D shaped cross section is provided in the auxiliary lamp unit 30. The light pipe 50A includes a greatly curved front face 51A and a flat rear face 53A. The light L4 that is emitted from the supplemental light source 70 is reflected off the upper tier 74 of the supplemental reflector 72 and enters the rear face 53A exiting the front face 51A thereby passing through the light pipe 50A. Due to the curved shape of the front face 51A, light is unevenly distributed.

As seen in FIG. 5, the light pipe 50 is provided with a generally curved polygon cross sectional shape, including a slightly curved front face 51. The front face 51 is provided with a radius of curvature greater than the height of the light pipe 50 and that is greater than the radius of curvature of the front face 51A in FIG. 4. The greater radius of curvature allows the light L4 reflected from the reflective surface of the upper tier 74 to pass through the light pipe 50 with a more concentrated distribution thereby providing a more uniform appearance.

With reference to FIGS. 2 and 7, an inner surface 80 of the inner auxiliary lens cover 38 is discussed. The inner auxiliary lens cover 38 includes a first leg 82 that corresponds to the first leg 40 of the auxiliary section 24, and a second leg 84 that corresponds to the second leg 42 of the auxiliary section 24. An elongated pillow optic 86 is provided on the inner surface 80 of the inner auxiliary lens cover 38. The elongated pillow optic 86 extends along the length of the second leg 84. The inner surface 80 also includes a pillow surface texture 88 formed of a plurality of small pillow optics. The elongated pillow optic 86 is positioned such that the pillow surface texture 88 extends along both sides of the elongated pillow optic 86. As best seen in FIG. 7, the elongated pillow optic 86 extends outwardly from the inner surface 80 of the inner auxiliary lens cover 38 farther than the pillow optics of the pillow surface texture 88. In addition, the elongated pillow optic 86 is wider than the pillow optics of the pillow surface texture 88.

The pillow surface texture 88 extends along the entire portion of the second leg 84 covering the second lighting device 34, and extends along a portion of the first leg 82 of the inner auxiliary lens cover 38 covering a portion of the light pipe 50 of the first lighting device 32. The pillow surface texture 88 tapers and dissipates extending towards a distal end 90 of the first leg 82. Optionally, the pillow surface texture 88 extends along the entire length of the first leg 82. The elongated pillow optic 86 and the pillow surface texture 88 on the second leg 84 distribute light L1 emitted by the plurality of second light sources 64 so as to evenly distribute the light L1 from the second lighting device 34. The pillow surface texture 88 and the elongated pillow optic 86 distribute the light L4 emitted from the supplemental light source 70, and the light L3 diffused from the light pipe 50.

From the foregoing, it can be seen that the present invention provides a vehicle lamp assembly having an auxiliary lamp unit which provides a uniform lit appearance across a first lighting device and a second lighting device. Having described the invention, however, many modifications thereto will become apparent to those skilled in the art to which it pertains without deviation from the spirit of the invention as defined by the scope of appended claims.

It is claimed:

1. A vehicle lamp assembly comprising:
a lamp housing;
a primary lamp unit; and
an auxiliary lamp unit having a first lighting device, a second lighting device, and a supplemental lighting device, said first lighting device configured to illuminate a portion of said lamp housing in a first direction, said second lighting device configured to illuminate a portion of said lamp housing in a second direction, said supplemental lighting device positioned in said lamp housing at an intersection of said first direction and said second direction to provide a uniform illuminated appearance at a transition of said first lighting device and said second lighting device.

2. The vehicle lamp assembly of claim 1, wherein said lamp housing includes a primary section and a separate auxiliary section, said primary section receives said primary lamp unit, and said auxiliary section receives said auxiliary lamp unit.

3. The vehicle lamp assembly of claim 2, wherein said auxiliary section includes a first leg extending in said first direction and a second leg extending in said second direction, said first lighting device positioned within said first leg, and said second lighting device positioned within said second leg.

4. The vehicle lamp assembly of claim 3, wherein said first lighting device includes an elongated light pipe and a first light source, said elongated light pipe having a proximate end, a distal end, and a front face and an opposing rear face, said proximate end facing said first light source to transmit and diffuse light across said elongated light pipe.

5. The vehicle lamp assembly of claim 4, wherein said light pipe includes a curved portion adjacent said proximate end, and wherein said supplemental lighting device is positioned behind said curved portion of said light pipe.

6. The vehicle lamp assembly of claim 5, wherein said supplemental lighting device includes a supplemental light source and a supplemental reflector, said supplemental light source positioned behind said first light source and said supplemental reflector positioned behind said curved portion of said light pipe, and wherein a portion of light emitted by said supplemental light source is directed by said supplemental reflector to enter said rear face of said curved portion of said light pipe and exit said front face of said curved portion of said light pipe to increase an intensity of illumination of said curved portion of said light pipe.

7. The vehicle lamp assembly of claim 6, wherein said second lighting device includes a plurality of second light sources and an elongated reflector extending along said second direction, said elongated reflector having a plurality of shaped portions corresponding to each of said plurality of second light sources.

8. The vehicle lamp assembly of claim 7, wherein said plurality of said second light sources are light emitting diodes disposed on a single circuit board.

9. The vehicle lamp assembly of claim 6, wherein said supplemental reflector has a stepped parabolic shape to direct light emitted from said supplemental light source to said rear face of said light pipe across a length of said curved portion.

10. The vehicle lamp assembly of claim 9, wherein said supplemental reflector includes a secondary tier extending from said light pipe to said elongated reflector of said second light device.

11. The vehicle lamp assembly of claim 6, wherein said rear face of said curved portion of said light source has a generally flat shape.

12. The vehicle lamp assembly of claim 6, wherein said first light source and said second light source are light emitting diodes.

13. The vehicle lamp assembly of claim 2, wherein an inner lens covers said auxiliary section and said auxiliary lamp unit.

14. The vehicle lamp assembly of claim 13, wherein an outer lens covers a portion of said lamp housing includes said primary section and said auxiliary section, and wherein said inner lens is positioned between said lamp housing and said outer lens.

15. A vehicle lamp assembly comprising:
a lamp housing having a primary section and an auxiliary section having a first leg and a second leg;
an outer lens covering a portion of said lamp housing includes said primary section and said auxiliary section;
an inner lens covers said auxiliary section, said inner lens positioned between said auxiliary section and said outer lens;
a primary lamp unit positioned within said primary section; and
an auxiliary lamp unit positioned within said auxiliary section, said auxiliary lamp having a first lighting device positioned within said first leg, a second lighting device positioned within said second leg, and a supplemental lighting device, said first lighting device configured to illuminate said first leg in a first direction, said second lighting device configured to illuminate said second leg in a second direction, said supplemental lighting device positioned in said auxiliary section an intersection of said first leg and said second leg to provide a uniform illuminated appearance at a transition of said first lighting device and said second lighting device.

16. The vehicle lamp assembly of claim 15, wherein said first lighting device includes an elongated light pipe and a first light source, said elongated light pipe having a proximate end, a distal end, and a front face and an opposing rear face, said proximate end facing said first light source to transmit and diffuse light across said elongated light pipe.

17. The vehicle lamp assembly of claim 16, wherein said light pipe includes a curved portion adjacent said proximate end, and wherein said supplemental lighting device is positioned behind said curved portion of said light pipe.

18. The vehicle lamp assembly of claim 17, wherein said supplemental lighting device includes a supplemental light source and a supplemental reflector, said supplemental light source positioned behind said first light source and said supplemental reflector positioned behind said curved portion of said light pipe, and wherein a portion of light emitted by said supplemental light source is directed by said supplemental reflector to enter said rear face of said curved portion of said light pipe and exit said front face of said curved portion of said light pipe to increase an intensity of illumination of said curved portion of said light pipe.

* * * * *